G. M. EATON.
ELECTRIC RAILWAY VEHICLE.
APPLICATION FILED SEPT. 8, 1908.

993,589.

Patented May 30, 1911.
3 SHEETS—SHEET 1.

WITNESSES:

INVENTOR
George M. Eaton
BY
ATTORNEY

G. M. EATON.
ELECTRIC RAILWAY VEHICLE.
APPLICATION FILED SEPT. 8, 1908.

993,589.

Patented May 30, 1911.
3 SHEETS—SHEET 2.

WITNESSES:
C. L. Belcher
Otto S. Schairer

INVENTOR
George M. Eaton
BY
ATTORNEY

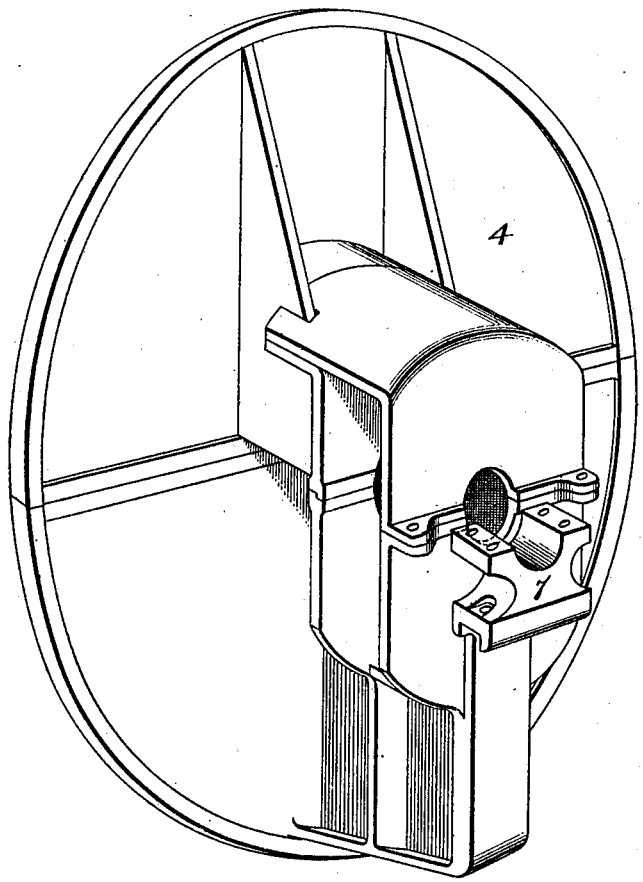

UNITED STATES PATENT OFFICE.

GEORGE M. EATON, OF WILKINSBURG, PENNSYLVANIA, ASSIGNOR, BY MESNE ASSIGN-MENTS, TO WESTINGHOUSE ELECTRIC & MANUFACTURING COMPANY, OF EAST PITTSBURG, PENNSYLVANIA, A CORPORATION OF PENNSYLVANIA.

ELECTRIC-RAILWAY VEHICLE.

993,589.      Specification of Letters Patent.      Patented May 30, 1911.

Application filed September 8, 1908. Serial No. 452,095.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric-Railway Vehicles, of which the following is a specification.

My invention relates to electric railway vehicles, and particularly to means for operatively connecting the propelling motors to the parts driven thereby.

The object of my invention is to so construct and arrange the parts of a vehicle that the geared driving connections between the propelling motor and the driving wheels may be placed outside of the wheels, in order that the motor may occupy substantially all of the space between the driving wheels, and thus permit of the employment of larger motors than could otherwise be utilized.

Figure 1:
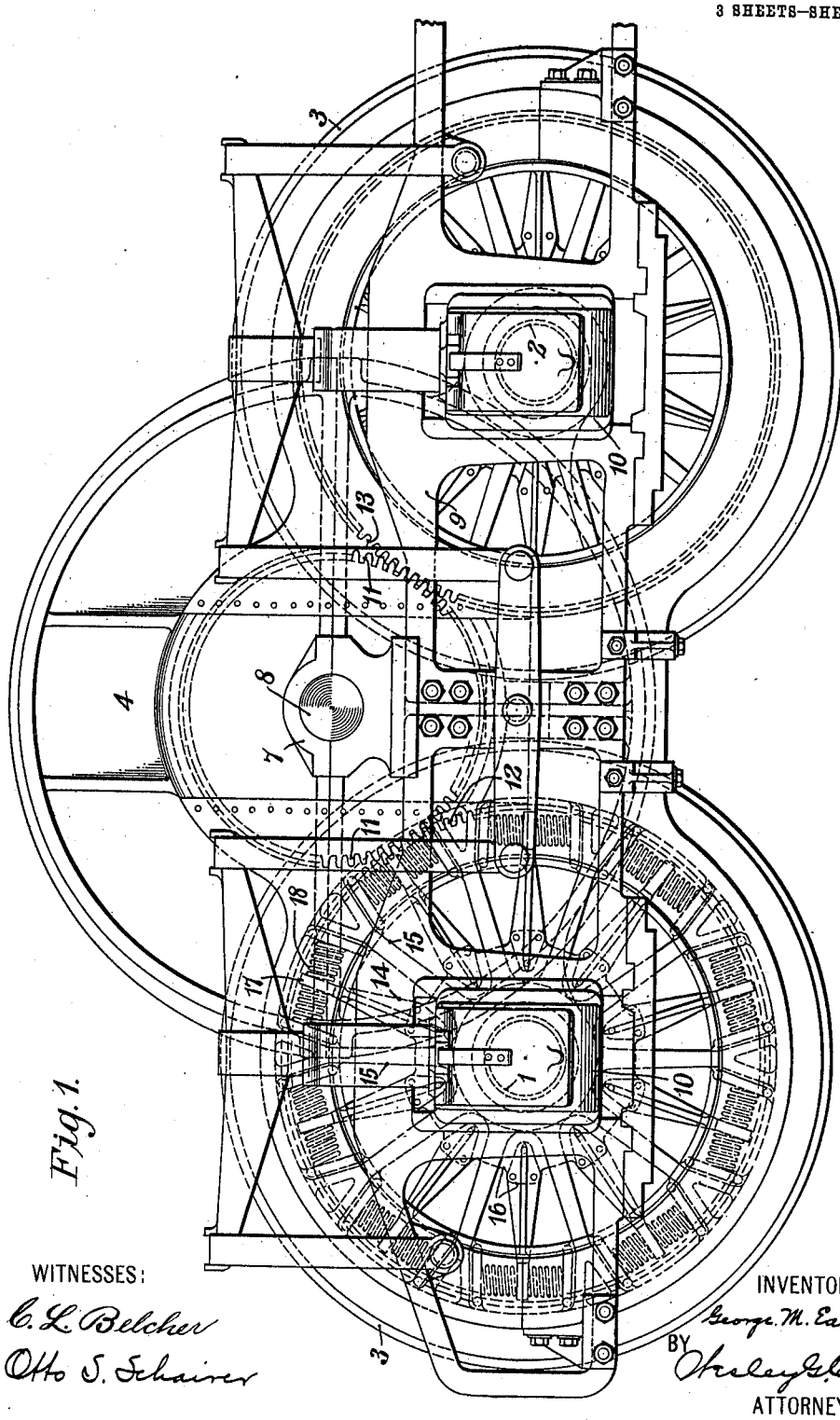
Figure 2:
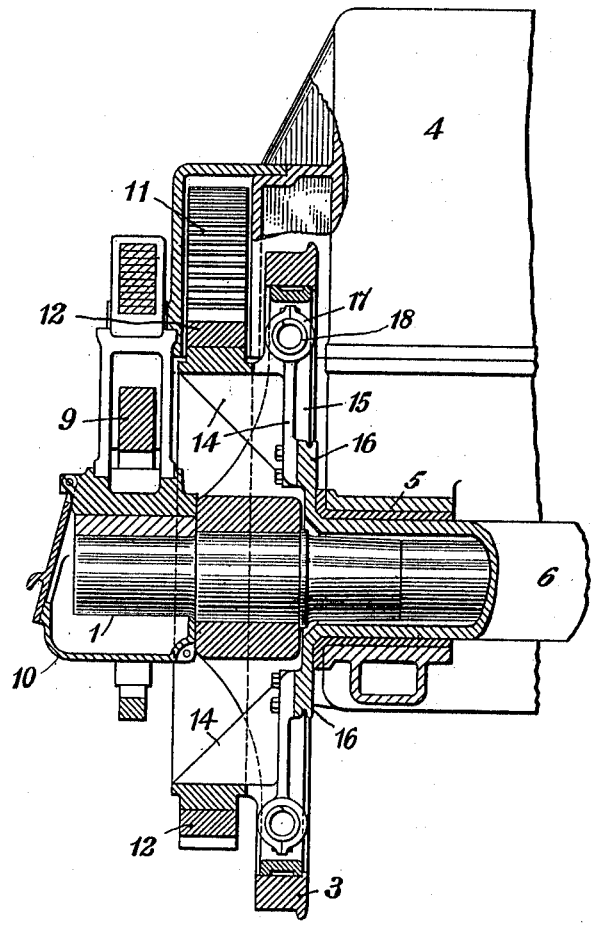

Figure 1 of the accompanying drawings is a view, in side elevation, of a portion of a locomotive embodying my invention. Fig. 2 is a view, in end elevation and in vertical section, of some of the parts shown in Fig. 1, and Fig. 3 is a perspective view of an end bracket of the propelling motor of the vehicle.

Located between, and largely above the main axles 1 and 2 of an electric locomotive having driving wheels 3, is a motor 4 that extends between the wheels upon each axle and is provided upon each side, near its bottom, with bearings 5 for quills 6 that loosely surround the driving axles.

Bearings 7 for the motor shaft 8 are mounted upon a main frame 9 for the locomotive that is resiliently supported upon journal bearings 10 by any suitable means, such as that illustrated, which is deemed unnecessary to describe in detail since it constitutes no part of the present invention.

Mounted upon the shaft 8, and near its extremities, are gear wheels 11 that are located outside of the driving wheels 3, the said gear wheels meshing with other gear wheels 12 and 13 of annular form and having arms 14 that extend inwardly between the spokes 15 of the driving wheels and are bolted, or otherwise suitably secured, to flanges 16 at the extremities of the quills 6. The gear wheels thus serve to operatively connect the motor shaft 8 to the quills 6, while the bearings 5 maintain the motor and the quills in fixed relations with respect to each other, oscillations or variations in the positions of the driving axles within the quills 6 being permitted because they are loosely surrounded by the quills. The arms 14 are provided with extensions 17 of annular form that embrace and grip the middle portions of helical compression springs 18 which constitute parts of resilient operative connections between the driving wheels and the gear wheels 12 or quills 6, such connections being set forth more fully in application, Serial No. 426,344, filed April 10, 1908, by John E. Webster and assigned to the Westinghouse Electric & Manufacturing Company.

It will be noted that the gear wheels 11, 12, and 13, constituting a portion of the means for operatively connecting the motor to the driving wheels, are located outside of the driving wheels, thus leaving all of the space between the wheels to be occupied by the motor, which, obviously, may be of larger size than would otherwise be permitted.

I claim as my invention:

1. In an electric railway vehicle, the combination with two parallel axles having driving wheels, and quills surrounding the axles and yieldingly connected to the wheels, of a motor mounted between the axles and extending between the driving wheels, and operative connections between the motor and the quills, said connections comprising gear wheels located outside of the driving wheels.

2. In an electric railway vehicle, the combination with a pair of axles having driving wheels, of a motor located between said axles, and operative connections between the motor and both axles, said connections comprising gear wheels located outside of the driving wheels and yielding connections between the gear wheels and the driving wheels.

3. In an electric railway vehicle, the combination with an axle having driving wheels, and a quill surrounding the axle, of a motor located between the driving wheels and having bearings upon the quill, intermeshing gear wheels connected respectively to the motor and to the quill, and means operatively and resiliently connecting the quill to the driving wheels.

4. In an electric railway vehicle, the combination with two parallel axles having driving wheels, and quills surrounding the axles, of a motor mounted between the axles and extending between the driving wheels, bearings for the motor upon the quills, a gear wheel actuated by the motor and located outside the driving wheels, other gear wheels meshing therewith and connected respectively to the quills, and means operatively and resiliently connecting the quill to the driving wheels.

In testimony whereof, I have hereunto subscribed my name this 31st day of August, 1908.

GEORGE M. EATON.

Witnesses:
 JAS. L. C. DAVIS,
 BIRNEY HINES.

Copies of this patent may be obtained for five cents each, by addressing the "Commissioner of Patents, Washington, D. C."